(No Model.)
H. J. MÜLLER.
Switch for Dynamo Electric Machines.
No. 243,598. Patented June 28, 1881.
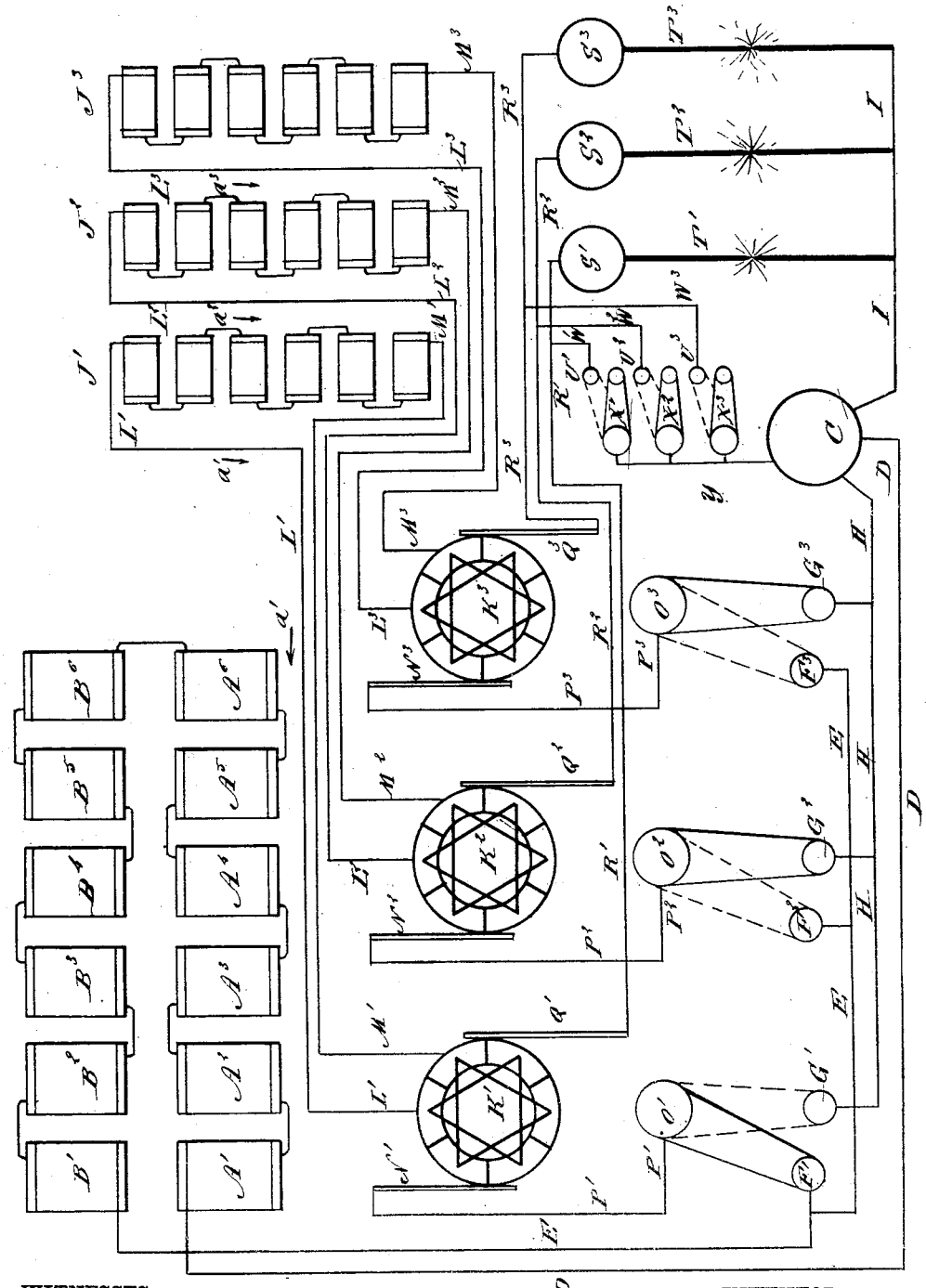
WITNESSES:
C. Neveux
C. Sedgwick
INVENTOR:
H. J. Müller
BY Munn & Co.
ATTORNEYS.

UNITED STATES PATENT OFFICE.

HANS J. MÜLLER, OF NEW YORK, N. Y., ASSIGNOR TO HIMSELF AND ALEXANDER LEVETT, OF SAME PLACE.

SWITCH FOR DYNAMO-ELECTRIC MACHINES.

SPECIFICATION forming part of Letters Patent No. 243,598, dated June 28, 1881.

Application filed April 2, 1881. (No model.)

*To all whom it may concern:*

Be it known that I, HANS J. MÜLLER, of the city, county, and State of New York, have invented a new and Improved Switch for Dynamo-Electric Machines, of which the following is a specification.

The object of my invention is to facilitate connecting the internal and external circuits of a dynamo-electric machine in such a manner that any one current can be used to excite the magnets only, or to excite the magnets and perform work in the external circuit, whereas the other currents perform work in the external circuits only, and so that any desired current or currents can be switched off altogether, so as not to perform any work either in the internal or external circuits, whereby the machine can be operated with a decreased quantity of motive power.

The invention consists in a series of switching devices, in combination with the circuits of the field-magnets, the circuits of the groups of armature-coils, and the external circuits, whereby the current of the field-magnets can be connected with any one external circuit and its corresponding circuit of the armature-coils.

The invention further consists in a series of switching devices, in combination with the external circuits and the circuits of the armature-coils, whereby any one external circuit can be shut off altogether, to permit operating the machine with less motive power.

In the accompanying drawing a diagram of the field-magnets, armature-coils, commutators, brushers, and internal and external circuits, is shown.

The field-magnets $A'$ to $A^6$ and $B'$ to $B^6$ are connected with each other in the manner described in my former patents, and the end of the wire of the magnet $A'$ is connected with the binding-post C by the wire D, and the end of the wire of the magnet $B'$ is connected with the switch-knobs $F'$, $F^2$, and $F^3$ by the wire E.

The switch-knobs $G'$ $G^2$ $G^3$ are connected with the binding-post C by the wire H.

The armature-coils of the group $J'$ are connected with each other, and the end of the wire of one end coil is connected with the corresponding section of the commutator $K'$ by the wire $L'$, and the end of the wire of the opposite coil is connected with the corresponding section of the commutator $K'$ by the wire $M'$, and in a like manner the armature-coils of the groups $J^2$ and $J^3$ are connected with their corresponding commutators, $K^2$ and $K^3$, by the wires $L^2$ and $L^3$ and $M^2$ $M^3$, respectively.

The brusher $N'$ of the commutator $K'$ is connected with the switch-lever $O'$ by the wire $P'$, and the brusher $Q'$ of the commutator $K'$ is connected with the binding-post $S'$ by the wire $R'$. In a like manner the brushers $N^2$ $N^3$ and $Q^2$ $Q^3$ of the commutators $K^2$ and $K^3$ are connected with the switch-levers $O^2$ $O^3$ and the binding-posts $S^2$ $S^3$ by the wires $P^2$ $P^3$ and $R^2$ $R^3$, respectively. The external lines, $T'$ $T^2$ $T^3$, run from the binding-posts $S'$ $S^2$ $S^3$ respectively, and are connected with the binding-post C by the ground-line T. The wires $R'$ $R^2$ $R^3$ of the brushers $Q'$ $Q^2$ $Q^3$ are connected with the switch-knobs $U'$ $U^2$ $U^3$ by the wires $W'$ $W^2$ $W^3$, respectively, and the switch-levers $X'$ $X^2$ $X^3$, and connected with the binding-post C by the wire Y.

The switch has been described with levers, but pins and plates or wires may be used in place of the levers without deviating from the invention.

The operation is as follows: If the current of the coils of the commutator-group $J'$ is to be used for exciting the field-magnets $A'$ to $A^6$ and $B'$ to $B^6$, and to perform work in the external circuit, the end of the switch-lever $O'$ is placed upon the knob $F'$, the switch-levers $O^2$ and $O^3$ remaining on the knobs $G^2$ and $G^3$, as shown. The groups $J^2$ and $J^3$ of the armature-coils will then be used for work only. The current generated in the armature-coils of the group $J'$ passes from the armature in the direction of the arrow $a'$, through the wire $L'$ to the commutator $K'$, brusher $N'$, wire $P'$, switch-lever $O'$, knob $F'$, wire E, magnets $B'$ to $B^6$ and $A^6$ to $A'$, wire D, binding-post C, ground-line I, external line, $T'$, binding-post $S'$, wire $R'$, brusher $Q'$, commutator $K'$, wire $M'$, back to the armature-coils of the group $J'$. The current of the group of armature-coils $J^2$ passes from the armature-coils through the wire $L^2$ to the commutator $K^2$, brusher $N^2$, wire $P^2$, switch-lever $O^2$, knob $G^2$, wire H, binding-post C, ground-line I, external line, $T^2$, binding-post $S^2$, wire $R^2$, brusher $Q^2$, commutator $K^2$, wire $M^2$, back to group $J^2$ of the armature-coils. The current of the armature-group $J^3$ passes through the machine and external line in a corresponding manner. Any armature-coil group may be used to charge the field-magnets and perform work in the external circuit by placing the corresponding switch-lever upon the corresponding knob, $F^2$ or $F^3$, and the other two lines will then perform work in the external circuit only. If any current is to be switched off entirely—for instance, the current produced by the armature-coil group $J'$—the switch-lever $X'$ is placed upon the knob $U'$. The current will then be short-circuited, and will pass from the binding-post C, through the wire Y, to the lever $X'$, knob $U'$, wire $R'$ to the commutator $K'$, and the corresponding group of armature-coils. The resistance offered by the machine is thus decreased proportionately, and consequently the machine can be operated with less power. In a like manner one or more lines can be switched off in case an accident should happen to these lines or to any group of armature-coils, and a great waste of power is thus avoided. If the group $J'$ of the armature-coils is to be used to charge the magnets only, the switch-lever $O'$ is placed upon the knob $F'$ and the switch-lever $X'$ upon the knob $U'$. The current will then be short-circuited, and will not perform any work in the external circuit. In the same manner the current of any other group of armature-coils can be used to charge or excite the magnets only, whereas the currents of one or more of the other groups of armature-coils perform work in the external circuit only, or may be switched off altogether, or, in other words, short-circuited.

I have shown only three groups of armature-coils and three switches for connecting the magnet and armature-currents, and three switches for connecting the external and armature currents; but I do not limit myself to this number, as I may use any desired number of armature groups and switches.

Having thus fully described my invention, I claim as new and desire to secure by Letters Patent—

1. In a dynamo-electric machine, the combination, with two or more internal circuits and two or more external circuits, of two or more switching devices, O, for connecting the respective circuits of the field-magnets and armature-coils, whereby any desired current can be used for work in the internal and external circuits, whereas the other currents perform work in the external circuits only, as set forth.

2. In a dynamo-electric machine, the combination, with two or more internal circuits and two or more external circuits, of two or more switching devices, $X'$, for connecting the armature-circuits and external circuits, whereby any desired currents can be switched off altogether, so as not to perform any labor in the internal or external circuits, thus permitting the machine to be operated with decreased power, as set forth.

3. In a dynamo-electric machine, the combination, with two or more internal circuits and two or more external circuits, of two or more switching devices for connecting the armature-circuits and magnet-circuits, and two or more switching devices for connecting the armature-circuits and the external circuits, whereby the current of any desired group of armature-coils can be used to charge the magnets only, whereas the other currents are used for work in the external circuits only, as set forth.

HANS J. MÜLLER.

Witnesses:
OSCAR F. GUNZ,
C. SEDGWICK.